June 23, 1942.  C. HABART ET AL  2,287,303
PRUNING SHEARS
Filed July 4, 1939
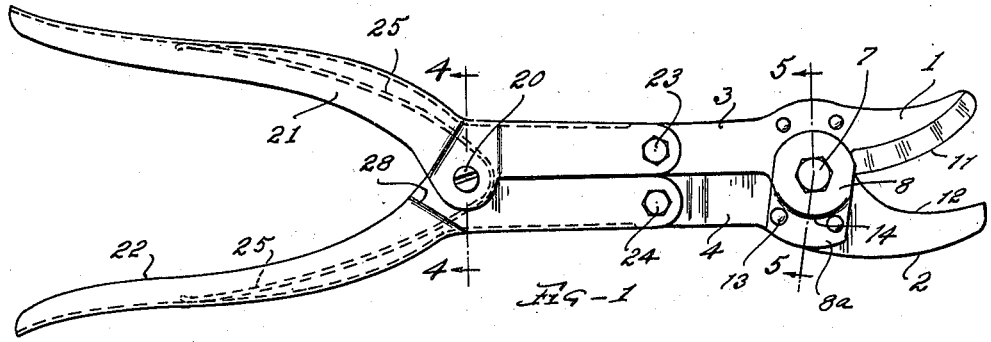
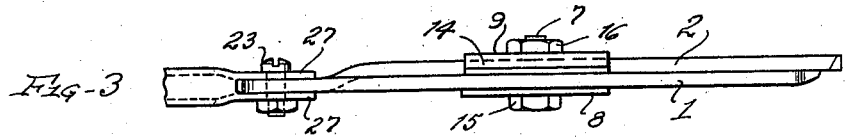
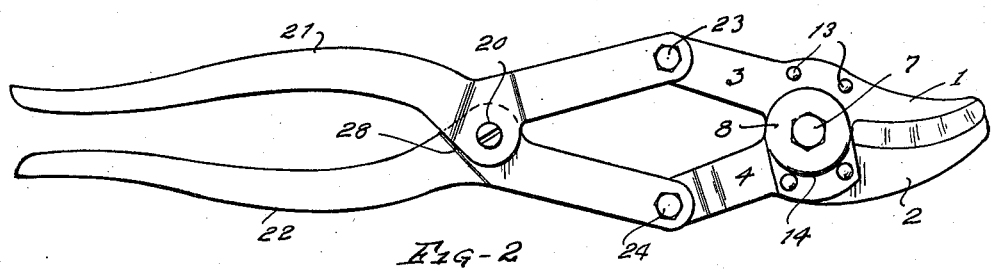
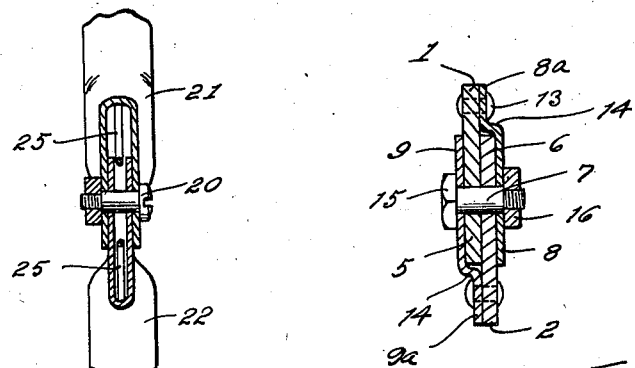
INVENTORS
Charles Habart
John Lukes
By George M. Soule
ATTORNEY.

Patented June 23, 1942

2,287,303

UNITED STATES PATENT OFFICE 2,287,303

PRUNING SHEARS

Charles Habart and John Lukes, Cleveland, Ohio

Application July 4, 1939, Serial No. 282,769

3 Claims. (Cl. 30—252)

This invention relates to pruning tools. An object is to provide a pruning shear mechanism for operating the cutting members by hand, which mechanism will enable the shears to be opened an adequate distance to receive easily such branches as can be cut by hand shears; and in or with which mechanism all positions of the cutting members, necessary to effect cutting, are unaccompanied by relationships of the operating handles such as to make them inconvenient to grasp to advantage and to operate effectively through entire cutting movements without danger of pinching the fingers of the operator.

Other objects include the provision of high quality pruning shears which can be produced in quantity inexpensively, which can be operated effectively at considerable mechanical advantage as regards hand power input, which will be durable and not subject to inaccurate cutting due to failure on part of the shear-blade-connecting pivot member to force the blades toward each other (endwise looseness of pivot bolt), and which will be free from likelihood of failure to open due to accumulation of foreign matter at pivotal connections.

Another specific object is to reduce the percentage of high priced material in pruning tools of the class shown and without sacrifice of operating advantages such as referred to above.

The invention will be described in connection with one illustrated embodiment, application of the principles to other forms and types being apparent therefrom.

In the drawing, Figs. 1 and 2 are side views of one form of pruning tool illustrating different relative positions of the parts; Fig. 3 is a fragmentary edge view of the shear blades and connections to adjacent operating handle portions; and Figs. 4 and 5 are transverse sectional views as indicated at 4—4 and 5—5 on Fig. 1.

Referring further to the drawing, the cutting blades thereof are indicated at 1 and 2, these having shank portions 3 and 4, respectively, and overlapping semicircular ear portions at 5 and 6 (see Fig. 5) for enabling pivotal connection as by a bolt or pin 7. The blade and shank members are not crossed as in ordinary shears, the advantage of which non-crossed arrangement will be later made apparent.

A feature of the invention lies in the provision of plates 8 and 9 rigid with respective blades and so arranged that each blade assembly (blade and plate) embraces the other blade assembly in the region of pivoting, and holds the cutting edges (indicated at 11 and 12) in close sliding contact for direct shearing action on the work. The blades are beveled in opposite directions adjacent the cutting edges and at appropriate angles as determined by the nature of expected use; and the blades slide past each other at the cutting edges for the full length of the blades. The upper blade does most of the cutting, particularly if the sharpening on the lower blade is at a relatively wide angle, as preferred.

The plates 8 and 9 are essentially identical stampings with circular main portions, concentric with the pivot pin, and offset flanges 8a and 9a secured to respective blades as by rivets 13. The flanges provide circular shoulders 14 in partially embracing relation to respective ears and guarding the continuously overlapping parts of the blades against entrance of dirt and the like therebetween.

The construction enables the use of a pivot pin which extends only through the ears 5 and 6, in other words, one that does not require any head and nut such as shown at 15 and 16. In event the pin 7 extends only through the ears 5 and 6, then the aligned holes in the plates 8 and 9 which receive the pivot pin in the construction shown, as in Fig. 5, would be omitted in order to prevent movement of the pin endwise out of engagement with the openings of the ears 5 and 6.

In the actual construction shown, the pin 7 is shouldered adjacent the threads in a well known manner, so that the nut can be jammed tightly against the shoulder without likelihood of drawing the overlapping parts too snugly together. The removable bolt enables ready disassembly of the tool parts for cleaning and for sharpening the blades, it being evident that if the pin 7 pivotally connects only the ears 5 and 6 and the plates 8 and 9 have no openings to receive the pin, the blades could not then be detached from each other except by removing at least one of the plates 8 and 9 from the respective blades.

The hand-grip members 21 and 22 are pivoted together as by a pin or bolt 20, and the shorter end portions of these members are pivotally connected to the shanks of the blades 1 and 2, respectively, as at 23 and 24, in such manner that movement of the free ends of the handle members toward each other closes the shear blades. This toggle-like action for pincers and other tools is already known, but the particular arrangement shown and in which the shear blades do not cross and can extend past each other for full shearing action is believed new. It is of particular advantage in pruning shears, viz: in obtaining the desired length of tool without requiring long hand grip members or wide spread of the latter in opening the blades an adequate distance to receive the work in positions that are difficult to reach as by reason of concealing foliage, and in preserving fairly narrow dimensions laterally of the tool when the blades are wide open. Fig. 1 illustrates the latter point. A specific advantage is that relatively short blades can be made to open sufficiently to receive any branch that can be cut by hand, or so as to operate effectively on branches in positions such as make them difficult to reach, without having the hand grip portions of the handles spread apart too far for effective gripping by one hand when the blades are fully open, or coming so close together as to be likely to pinch the fingers, if therebetween, when the blades are fully closed.

The handle members are symmetrically folded sheet metal stampings lying in the same plane, as brought out particularly in Fig. 4. The handgrip portions are C-shaped, and at and beyond the connecting pivot 20 the sides of the two stampings are substantially parallel and fairly close together for lateral compactness of the entire working end of the tool. A spreader spring of wire is shown at 25, comprising a generally V-shaped spring, the apex portion of which loosely surrounds the pivot pin 20 (a bolt and nut assembly, as shown), and with arms lying in concealed positions within respective C-shaped gripping portions.

Fig. 4 illustrates the relationship of the operating handle member portions to each other near the pivot 20. Beyond the pivot toward the blade shanks the arms of the handle members are of narrow U-shaped cross section, the flanges being extended beyond the U-shaped section as at 27, Fig. 3, for embracing the ends of the blade shanks.

Arresting abutments for preventing movement of the gripping portions toward each other beyond such position as necessary to close the blades can be provided by shoulders 28, one of which is shown in idle and active positions, respectively, in Figs. 1 and 2. The shoulders engage edges of the stamping comprising the handgrip member 21, near the pivot, as illustrated in Fig. 2. Movement of the parts into blade-opening position is limited definitely by the abutment of the shank portion of the blades adjacent the pivot members 23, the shank 4 being bent to underlie the shank 3 at that region as shown in Fig. 3.

The distance from the pivot pin 7 to the pins 23 is preferably less than from the pivot 20 to the pins 23 so that the blades open and close through a greater angle than the hand-grip members. Nevertheless, there is adequate mechanical advantage as between the hand grips and blades.

We claim:

1. The improvement in pruning shears comprising cooperating non-crossed shear blade members with apertured overlapping ear portions and shank portions extending parallel to each other in the open position of the blades, mechanism connected to the shank portions for operating the blades, a pivot pin in the apertures of the ear portions, and a pair of plates rigid with respective blade members, each plate extending snugly in face-to-face contact with the ear portion of the other blade member so as to hold the blades in close sliding shearing relationship to each other independently of the pivot pin.

2. The improvement according to claim 1 wherein the ears are semi-circular and the plates are complementary shoulder portions at the circular edges of the ears extending circumferentially along said edges and in guarding relation thereto.

3. A pruning tool comprising a pair of relatively flat sheet metal shear blades having parallel shank portions in edgewise abutting alignment, mutually overlapping apertured ear formations providing pivot portions, plates rigid with respective blades laterally beyond the ear formation of the other, each plate extending in snug abutting relation to the ear formation of the other to hold the blades in shearing relationship, pivot means engaging the apertures of the ear formations, said blades having shear-cutting edges adapted to slide past each other and spaced a considerable distance apart when the shanks are in edgewise abutting contact and oppositely curved to provide a receiving throat for branches and the like to be pruned, a pair of hand grip elements with gripping portions operable by one hand, pivoted to each other beyond the ends of the shanks from the blade pivot and having arms pivoted to the ends of the shanks lying remotely of the blade pivot for spreading the shanks apart and thereby causing the shearing edges to cut the work as the gripping portions are brought toward each other by hand pressure thereon, and spring means arranged for normally speading the gripping portions apart to open the blades.

CHARLES HABART.
JOHN LUKES.

CERTIFICATE OF CORRECTION.

Patent No. 2,287,303.  June 23, 1942.

CHARLES HABART, ET AL.

It is hereby certified that error appears in the printed specification of the above numbered patent requiring correction as follows: Page 2, second column, line 24, claim 2, for the words "are complementary" read --have complementary--; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.